US012580406B2

(12) United States Patent
      Lu et al.

(10) Patent No.:     US 12,580,406 B2
(45) Date of Patent:        Mar. 17, 2026

(54) OPTIMIZING BATTERY CHARGING WITH SYNCHRONIZED CONTEXT DATA

(71) Applicant: Apple Inc., Cupertino, CA (US)

(72) Inventors: Gina B Lu, San Francisco, CA (US); Kartik R Venkatraman, San Francisco, CA (US); Aaron Cotter, San Francisco, CA (US); Alexander D Palmer, San Jose, CA (US)

(73) Assignee: Apple Inc., Cupertino, CA (US)

( * ) Notice:     Subject to any disclaimer, the term of this patent is extended or adjusted under 35 U.S.C. 154(b) by 739 days.

(21) Appl. No.: 17/933,712

(22) Filed:     Sep. 20, 2022

(65)                Prior Publication Data

US 2024/0097470 A1       Mar. 21, 2024

Related U.S. Application Data

(60) Provisional application No. 63/374,665, filed on Sep. 6, 2022.

(51) Int. Cl.
     *H02J 7/00*          (2006.01)
     *G06F 1/26*          (2006.01)
(52) U.S. Cl.
     CPC ............ *H02J 7/0071* (2020.01); *G06F 1/263* (2013.01); *H02J 7/0047* (2013.01)
(58) Field of Classification Search
     USPC ....................................................... 320/155
     See application file for complete search history.

(56)                References Cited

U.S. PATENT DOCUMENTS

| | | | |
|---|---|---|---|
| 6,357,040 B1 | 3/2002 | Porter | |
| 10,937,073 B2 | 3/2021 | Sharma | |
| 11,751,813 B2 | 9/2023 | Naveh | |
| 12,039,426 B2 | 7/2024 | Cella | |

(Continued)

FOREIGN PATENT DOCUMENTS

| | | |
|---|---|---|
| CN | 103403680 A | 11/2013 |
| CN | 105929927 A | 9/2016 |
| CN | 109643151 A | 4/2019 |

OTHER PUBLICATIONS

Office Action for U.S. Appl. No. 17/933,705, dated Oct. 18, 2023; 15 pgs.

(Continued)

*Primary Examiner* — Mohammed Alam
(74) *Attorney, Agent, or Firm* — FLETCHER YODER PC

(57)                ABSTRACT

An electronic device can include a power system including a battery and a processor programmed to: receive synchronized context data from one or more other devices associated with a user of the device, determine, at least in part based on the synchronized context data, one or more battery charging intervals, and operate the power system to charge the battery from the external power source during the identified one or more battery charging intervals. The processor can be programmed to determine the one or more battery charging intervals using a machine learning model. The synchronized context data can provide indication of the user's location. If the synchronized context data indicates that the user is at a different location than the device, the one or more battery charging intervals determined based at least in part on an expected time for the user to return to the location of the device.

21 Claims, 7 Drawing Sheets

(56)                References Cited

U.S. PATENT DOCUMENTS

| | | | |
|---|---|---|---|
| 2008/0005381 | A1 | 1/2008 | Theocharous et al. |
| 2008/0005599 | A1 | 1/2008 | Theocharous et al. |
| 2009/0307368 | A1 | 12/2009 | Sriram |
| 2010/0131790 | A1 | 5/2010 | Zhang et al. |
| 2012/0131321 | A1 | 5/2012 | Jitkoff et al. |
| 2012/0196539 | A1 | 8/2012 | Lee |
| 2013/0046967 | A1 | 2/2013 | Fullerton |
| 2017/0353039 | A1* | 12/2017 | Sunyi .................... H02J 7/0071 |
| 2017/0357529 | A1 | 12/2017 | Venkatraman et al. |
| 2017/0359415 | A1 | 12/2017 | Venkatraman et al. |
| 2018/0081420 | A1 | 3/2018 | Jones et al. |
| 2019/0068528 | A1 | 2/2019 | Zhang et al. |
| 2019/0334353 | A1* | 10/2019 | Solomon ................. G06F 1/263 |
| 2020/0234350 | A1 | 7/2020 | Sharma |
| 2020/0303938 | A1 | 9/2020 | Owen et al. |
| 2020/0375544 | A1 | 12/2020 | Naveh |
| 2020/0380984 | A1 | 12/2020 | Venkatraman et al. |
| 2024/0053410 | A1* | 2/2024 | de la Cropte de Chanterac ......... G06F 1/329 |
| 2024/0055885 | A1* | 2/2024 | de la Cropte de Chanterac ......... H02J 7/00034 |

OTHER PUBLICATIONS

International Search Report and Written Opinion for PCT Application No. PCT/US2023/031663 dated Dec. 20, 2023; 12 pgs.
Non-Final Office Action for U.S. Appl. No. 17/933,699 dated Mar. 7, 2024; 23 pgs.
International Search Report and Written Opinion for PCT Application No. PCT/US2023/031661 dated Dec. 18, 2023; 10 pgs.
International Search Report and Written Opinion for PCT Application No. PCT/US2023/031658 dated Dec. 20, 2023; 11 pgs.
Notice of Allowance for U.S. Appl. No. 17/933,699 dated Aug. 2, 2024; 7 pgs.

* cited by examiner

| | |
|---|---|
| Processor | 101 |
| Memory | 102 |
| Storage | 103 |
| Display | 104 |
| Input Devices | 105 |
| I/O Interface | 106 |
| Network Interface | 107 |
| Power System | 108 |

Client on Device A

531 — Subscribe to Context(s)

532 — Receive Subscribed Contexts

533 — Evaluate Conditions & Contexts

534 — Perform Action Based on Evaluation

207

Client on Device B

Send Non-Filtered Contexts — 535

Conditions for Filtered Contexts? — 536

Send Filtered Contexts — 537

600

Charge State

641

Plug-in    642    Pause    643    Resume    644    Un-plug    640    645    646    time

OPTIMIZING BATTERY CHARGING WITH SYNCHRONIZED CONTEXT DATA

CROSS-REFERENCE TO RELATED APPLICATIONS

This application claims the benefit of U.S. Provisional Application No. 63/374,665, filed Sep. 6, 2022, entitled "MULTI-DEVICE CONTEXT SYNCHRONIZATION AND APPLICATIONS THEREOF," which is hereby incorporated by reference in its entirety for all purposes.

BACKGROUND

Users may have a plurality of electronic devices, including, for example, a smart phone, a tablet computer, a laptop computer, a desktop computer, a smart watch, etc. In some cases, users may have multiple examples of such electronic devices. There may be applications for which it would be desirable for such devices to be used cooperatively. To that end, it may be desirable to exchange information among such devices. Although there are existing techniques that allow for such synchronization, these techniques can suffer from disadvantages relating to query frequency, network bandwidth, and other issues as the number of items to be synchronized increases.

SUMMARY

Disclosed herein are improved techniques for synchronizing data, particularly context data, among a plurality of electronic devices associated with a user. Also disclosed are various exemplary applications that can be enabled by such context synchronization.

A method of reducing power consumption in an electronic device, performed by one or more processors of the electronic device, can include analyzing device usage data associated with the device to predict an extended period of user inactivity, the usage data including at least one of historical usage data and present usage signals and entering an enhanced reduced power state by implementing one or more power saving optimizations for at least a portion the extended period of extended user inactivity, the one or more power saving optimizations slowing, delaying, or interrupting one or more normal activities normally performed by the device. The method can further include exiting the enhanced reduced power state by suspending the one or more power saving optimizations. Exiting the enhanced reduced power state can be performed in response to at least one of: user activity; a specified user routine; or a time predicted by the analyzing device usage data.

The device usage data can include both historical usage data and present usage signals. The usage data can include synchronized context information from one or more remote devices associated with a user of the device. The synchronized context information can include information corresponding to a location of a user that can be compared to a location of the device to trigger entry into the enhanced reduced power state. The one or more power saving optimizations include one or more items selected from the group consisting of: turning off or placing in a low power mode one or more radios of the electronic device, slowing or postponing background tasks, altering at least one of audio, visual, or haptic notifications provided to a user, and delaying or inhibiting wake events of the device.

A method of reducing power consumption in an electronic device, performed by one or more processors of the electronic device, can include analyzing device usage data associated with the device to predict an extended period of user inactivity, the usage data including historical usage data, present usage signals, and context information from one or more remote devices associated with a user of the device; and entering an enhanced reduced power state by implementing one or more power saving optimizations for at least a portion the extended period of extended user inactivity, the one or more power saving optimizations slowing, delaying, or interrupting one or more normal activities normally performed by the device. The method can further include exiting the enhanced reduced power state by suspending the one or more power saving optimizations. Exiting the enhanced reduced power state can be performed in response to at least one of: user activity; a specified user routine; or a time predicted by the analyzing device usage data.

The synchronized context information can include information corresponding to a location of a user that can be compared to a location of the device to trigger entry into the enhanced reduced power state. The one or more power saving optimizations include one or more items selected from the group consisting of: turning off or placing in a low power mode one or more radios of the electronic device, slowing or postponing background tasks, altering at least one of audio, visual, or haptic notifications provided to a user, and delaying or inhibiting wake events of the device.

An electronic device can include one or more processors, memory, storage, one or more input/output devices, and a power system. The electronic device can further include a usage predictor that analyzes device usage data to predict an extended period of user inactivity, the usage data including at least one of historical usage data and present usage signals; and a power management entity that causes the device to enter an enhanced reduced power state by implementing one or more power saving optimizations for at least a portion the extended period of extended user inactivity, the one or more power saving optimizations slowing, delaying, or interrupting one or more normal activities normally performed by the device. The usage predictor can include one or more processes running on the one or more processors, and the power management entity can include one or more processes running on the one or more processors. The power management entity can further cause the device to exit the enhanced reduced power state by suspending the one or more power saving optimizations. Exiting the enhanced reduced power state can be performed by the power management entity in response to at least one of: user activity; a specified user routine; or a time predicted by the analyzing device usage data.

The usage data can include synchronized context information from one or more remote devices associated with a user of the device. The synchronized context information can include information corresponding to a location of a user that can be compared to a location of the device to trigger entry into the enhanced reduced power state. The one or more power saving optimizations can include one or more items selected from the group consisting of: turning off or placing in a low power mode one or more radios of the electronic device, slowing or postponing background tasks, altering at least one of audio, visual, or haptic notifications provided to a user, and delaying or inhibiting wake events of the device.

An electronic device can include one or more processors, memory, storage, one or more input/output devices, and a power system. The electronic device can further include a usage predictor that analyzes device usage data to predict an extended period of user inactivity, the usage data including historical usage data, present usage signals, and synchronized context information from one or more remote devices associated with a user of the device; and a power management entity that causes the device to enter an enhanced reduced power state by implementing one or more power saving optimizations for at least a portion the extended period of extended user inactivity, the one or more power saving optimizations including slowing, delaying, or interrupting one or more normal activities normally performed by the device. The usage predictor can include one or more processes running on the one or more processors, and the power management entity includes one or more processes running on the one or more processors. The power management entity can further cause the device to exit the enhanced reduced power state by suspending the one or more power saving optimizations. Exiting the enhanced reduced power state can be performed by the power management entity in response to at least one of: user activity; a specified user routine; or a time predicted by the analyzing device usage data.

The synchronized context information can include information corresponding to a location of a user that can be compared to a location of the device to trigger entry into the enhanced reduced power state. The one or more power saving optimizations can include one or more items selected from the group consisting of: turning off or placing in a low power mode one or more radios of the electronic device, slowing or postponing background tasks, altering at least one of audio, visual, or haptic notifications provided to a user, and delaying or inhibiting wake events of the device.

A method of synchronizing context information between a plurality of electronic devices associated with a user, each device including one or more processors, communication interfaces, and memory or storage, can be performed by at least one of the devices and can include subscribing to one or more contexts, each context corresponding one or more properties, statuses, or other information corresponding to another of the plurality of electronic devices; and receiving periodic updates of the one or more subscribed contexts from a data store shared or distributed among the plurality of devices, wherein receiving periodic updates comprises pulling the periodic updates from the data store or receiving pushed updates from the data store. The one or more contexts can each be a key/value pair. The one or more subscribed contexts can include a subset of contexts available in the data store. The subscribed contexts can be filtered based on at least one of relevance or importance, wherein the relevance or importance of each context controls the frequency, scheduling, and prioritization of updates for that context.

The method can further include evaluating the subscribed contexts and one or more conditions on a local device and performing an action based on a result of the evaluation. The at least one context can correspond to a status of an application on another device of the plurality of electronic devices. In response to an update to the at least one context indicating that the user is using the application on the other device, performing an action based on the result of the evaluation can include initiating synchronization of application data associated with the application that would otherwise be performed at a later time. The at least one context can include one or more contexts corresponding to load, thermal state, or power status of other devices of the plurality of electronic devices, and performing an action based on the result of the evaluation can include providing a distributed processing task to one or more of the other electronic devices responsive to the one or more contexts corresponding to load, thermal state, or power status of other devices of the plurality of electronic devices.

A method of synchronizing context information between a plurality of electronic devices, each device including one or more processors, communication interfaces, and memory or storage, can be performed by at least one of the devices and can include providing periodic updates of one or more contexts associated with the device to a data store shared or distributed among the plurality of devices by responding to a pull request for the periodic updates from the data store or pushed updates to the data store. The one or more contexts can each comprise a key/value pair. The contexts can be filtered based on at least one of relevance or importance, wherein the relevance or importance of each context controls the frequency, scheduling, and prioritization of updates for that context.

A method of data synchronization among a plurality of electronic devices associated with a user can include, on one device of the plurality of electronic devices, subscribing to one or more contexts, at least one context corresponding to a status of an application on another device of the plurality of electronic devices; receiving periodic updates of the one or more subscribed contexts from a data store shared or distributed among the plurality of devices; and in response to an update to the at least one context indicating that the user is using the application on the other device, initiating synchronization of application data associated with the application that would otherwise be performed at a later time. The one or more subscribed contexts can include at least one context corresponding to a location of one or more of the plurality of electronic devices. A communication interface used to synchronize the application data can be selected at least in part based on the at least one context corresponding to the location of one or more of the plurality of electronic devices. The method can further include delaying synchronization of application data to one of the plurality of electronic devices if the at least one context corresponding to a location of one or more of the plurality of electronic devices suggest that the user is not using the application on that device.

A method of distributed processing among a plurality of electronic devices associated with a user can include, on one device of the plurality of electronic devices, subscribing to one or more contexts corresponding to load, thermal state, or power status of other devices of the plurality of electronic devices; receiving periodic updates of the one or more subscribed contexts from a data store shared or distributed among the plurality of devices; and providing a distributed processing task to one or more of the other electronic devices responsive to the one or more contexts corresponding to load, thermal state, or power status of other devices of the plurality of electronic devices.

The one or more subscribed contexts can include at least one context corresponding to load for one of the other electronic devices, and providing a distributed processing task to one or more of the other electronic devices responsive to the one or more contexts can further include assigning a distributed processing task to the other electronic device if the load is below a threshold and not assigning a distributed processing task to the other electronic device if the load is above the threshold.

The one or more subscribed contexts can include at least one context corresponding to thermal state for one of the other electronic devices, and providing a distributed processing task to one or more of the other electronic devices responsive to the one or more contexts can further include assigning a distributed processing task to the other electronic device if the thermal state is below a threshold and not assigning a distributed processing task to the other electronic device if the thermal state is above the threshold.

The one or more subscribed contexts can include at least one context corresponding to an AC power connection status for one of the other electronic devices, and providing a distributed processing task to one or more of the other electronic devices responsive to the one or more contexts can further include assigning a distributed processing task to the other electronic device if it is connected to AC power not assigning a distributed processing task to the other electronic device if it is not connected to AC power.

The one or more subscribed contexts can include at least one context corresponding to battery state of charge for one of the other electronic devices, and providing a distributed processing task to one or more of the other electronic devices responsive to the one or more contexts can further include assigning a distributed processing task to the other electronic device if state of charge is above a threshold and not assigning a distributed processing task to the other electronic device if the state of charge is below the threshold.

An electronic device can include a power system including a battery and a processor programmed to: detect connection of an external power source to the electronic device, determine an estimated disconnection time at which the external power source is expected to be disconnected from the electronic device based at least in part on synchronized context data from one or more other devices associated with a user of the device, identify one or more desired battery charging intervals prior to the estimated disconnection time, and operate the power system to charge the battery from the external power source during the identified one or more desired battery charging intervals. The processor can be programmed to determine an estimated disconnection time using a machine learning model.

The synchronized context data can provide indication of the user's location. If the synchronized context data indicates that the user is at a different location than the device, the estimated disconnection time can be determined based at least in part on an expected time for the user to return to the location of the device. The one or more desired battery charging intervals can be selected to reduce time that the battery spends at full charge. The processor can be further programmed to operate the power system to charge the battery from the external power source during the identified one or more desired battery charging intervals by regulating a rate of battery charging to reduce time that the battery spends at full charge.

The electronic device can further include a display, and the processor can be further programmed to communicate information about the one or more desired battery charging intervals to a user via the display. The electronic device can further include an input device, and the processor can be further programmed to receive user input regarding charging via the input device.

A method of operating an electronic device, performed by a processor of the electronic device, can include detecting connection of an external power source to the electronic device, determining an estimated disconnection time at which the external power source is expected to be disconnected from the electronic device based at least in part on synchronized context data from one or more other devices associated with a user of the device, identifying one or more desired battery charging intervals prior to the estimated disconnection time, and operating the power system to charge the battery from the external power source during the identified one or more desired battery charging intervals. Determining an estimated disconnection time can further include using a machine learning model.

The synchronized context data can provide an indication of the user's location. If the synchronized context data indicates that the user is at a different location than the device, the estimated disconnection time can be determined based at least in part on an expected time for the user to return to the location of the device. The one or more desired battery charging intervals can be selected to reduce time that the battery spends at full charge. The method can further include regulating a rate of battery charging to reduce time that the battery spends at full charge. The method can further include communicating information about the one or more desired battery charging intervals to a user via a display of the electronic device. The method can further include receiving user input regarding charging via an input of the electronic device.

An electronic device can include a power system including a battery and a processor programmed to: receive synchronized context data from one or more other devices associated with a user of the device, determine, at least in part based on the synchronized context data, one or more battery charging intervals, and operate the power system to charge the battery from the external power source during the identified one or more battery charging intervals. The processor can be programmed to determine the one or more battery charging intervals using a machine learning model.

The synchronized context data can provide indication of the user's location. If the synchronized context data indicates that the user is at a different location than the device, the one or more battery charging intervals determined based at least in part on an expected time for the user to return to the location of the device. The one or more desired battery charging intervals can be selected to reduce time that the battery spends at full charge. The processor can be further programmed to operate the power system to charge the battery during the one or more battery charging intervals by regulating a rate of battery charging to reduce time that the battery spends at full charge.

DETAILED DESCRIPTION

Figure 1:
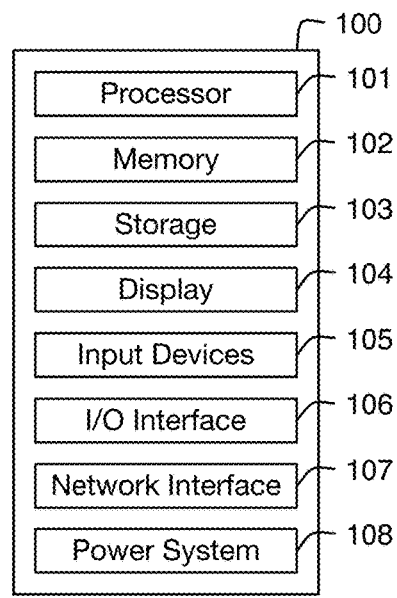
FIG. 1 illustrates a block diagram of an electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

INTRODUCTION

FIG. 1 is a block diagram of an electronic device 100, according to embodiments of the present disclosure. The electronic device 100 may include, among other things, one or more processors 101 (collectively referred to herein as a single processor for convenience, which may be implemented in any suitable form of processing circuitry), memory 102, nonvolatile storage 103, a display 104, input devices 105, an input/output (I/O) interface 106, a network interface 107, and a power system 108. The various functional blocks shown in FIG. 1 may include hardware elements (including circuitry), software elements (including machine-executable instructions), or a combination of both hardware and software elements (which may be referred to as logic). The processor 101, memory 102, the nonvolatile storage 103, the display 104, the input devices 105, the input/output (I/O) interface 106, the network interface 107, and/or the power system 108 may each be communicatively coupled directly or indirectly (e.g., through or via another component, a communication bus, a network, etc.) to one another to transmit and/or receive data amongst one another. It should be noted that FIG. 1 is merely one example of a particular implementation and is intended to illustrate the types of components that may be present in the electronic device 100.

By way of example, the electronic device 100 may include any suitable computing device, including a desktop or laptop/notebook computer (such as a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (such as an iPhone® available from Apple Inc. of Cupertino, California), a tablet computer (such as an iPad® available from Apple Inc. of Cupertino, California), a wearable electronic device (such as an Apple Watch® by Apple Inc. of Cupertino, California), and other similar devices.

Processor 101 and other related items in FIG. 1 may be embodied wholly hardware or by hardware programmed to execute suitable software instructions. Furthermore, the processor 101 and other related items in FIG. 1 may be a single contained processing module or may be incorporated wholly or partially within any of the other elements within the electronic device 100. Processor 101 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. Processor 101 may include one or more application processors, one or more baseband processors, or both, and perform the various functions described herein.

In the electronic device 100 of FIG. 1, processor 101 may be operably coupled with a memory 102 and a nonvolatile storage 103 to perform various algorithms. Such programs or instructions executed by processor 101 may be stored in any suitable article of manufacture that includes one or more tangible, computer-readable media. The tangible, computer-readable media may include the memory 102 and/or the nonvolatile storage 103, individually or collectively, to store the instructions or routines. The memory 102 and the nonvolatile storage 103 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by processor 101 to enable the electronic device 100 to provide various functionalities.

In certain embodiments, the display 104 may facilitate users to view images generated on the electronic device 100 In some embodiments, the display 104 may include a touch screen, which may facilitate user interaction with a user interface of the electronic device 100. Furthermore, it should be appreciated that, in some embodiments, the display 104 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input devices 105 of the electronic device 100 may enable a user to interact with the electronic device 100 (e.g., pressing a button to increase or decrease a volume level). The I/O interface 106 may enable electronic device 100 to interface with various other electronic devices, as may the network interface 107. In some embodiments, the I/O interface 106 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 107 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 107 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 107 of the electronic device 100 may allow communication over the aforementioned networks (e.g., 5G, Wi-Fi, LTE-LAA, and so forth).

The network interface 107 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power system 108 of the electronic device 100 may include any suitable source of power, such as a rechargeable battery (e.g., a lithium ion or lithium polymer (Li-poly) battery) and/or a power converter, including a DC/DC power converter, an AC/DC power converter, a power adapter (which may be external), etc.

Context Synchronization

Figure 2:
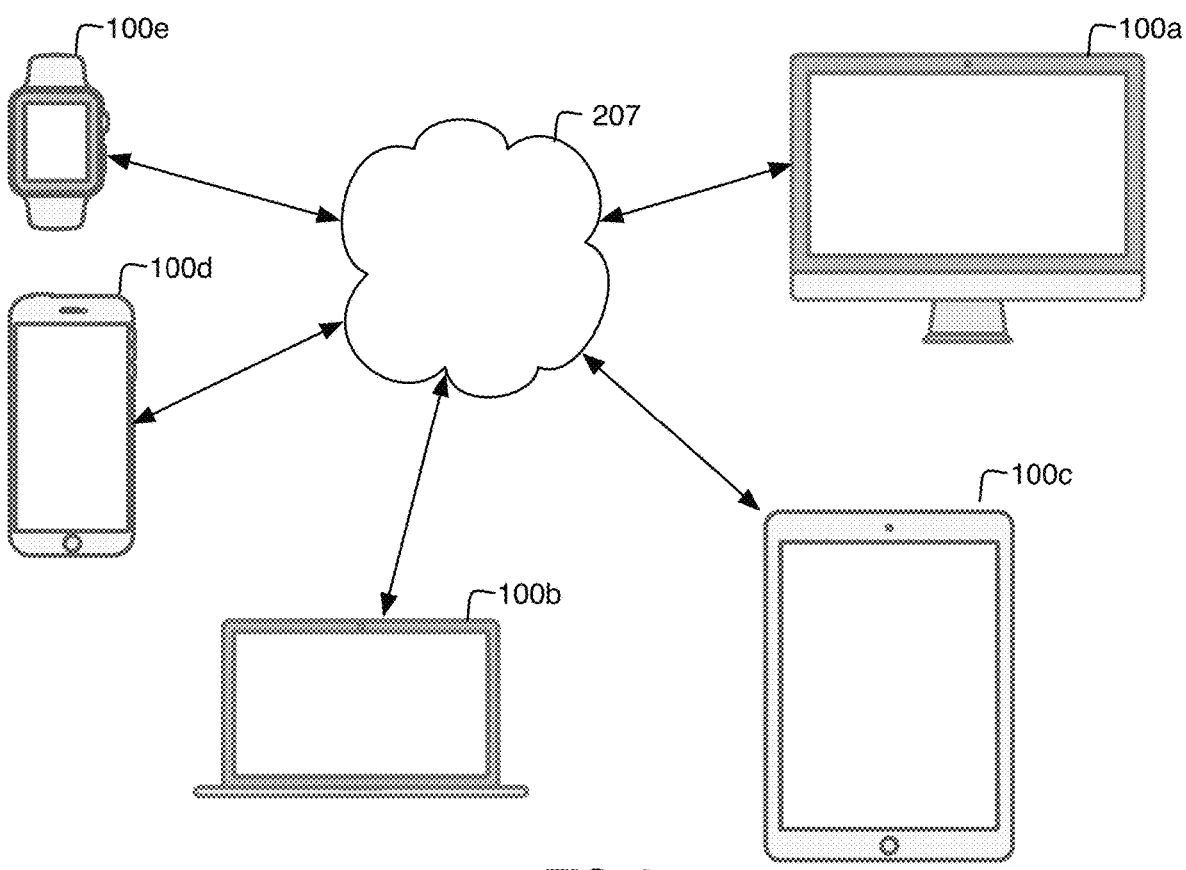
FIG. 2 illustrates a plurality of devices synchronizing context information.

FIG. 2 illustrates a plurality of devices synchronizing context information. The devices may all be associated with a particular user, such as a desktop computer 100a, a laptop or notebook computer 100b, a tablet 100c, a smartphone 100d, and/or a smartwatch 100e. Additionally, other electronic devices could also be included, such as wireless earphones, styluses, keyboards, mice, trackpads, or other input peripherals, smart home devices including hubs, sensors, actuators, etc. These various devices may exchange or synchronize among themselves data that can be used in a wide variety of ways to enhance the user's experience with the devices. As described in greater detail below, this data can include one or more "contexts" which can be key/value pairs describing a particular property, status, or other information available on one device that may be relevant to one or more other devices. These contexts may be synchronized among the devices in various ways as described in greater detail below. In the illustration of FIG. 2, these contexts are shown as being exchanged through a cloud 207. Various implementations of such systems are described in greater below but may include any appropriate combination of shared or distributed data stores and communication paths by which the context data is exchanged. In the case of devices that are at the same location (e.g., smartphone 100d and smartwatch 100e) the exchange may take place over local communication channels, such as Bluetooth, WiFi, or wired LAN if available. For devices not at the same location, such as a laptop computer 100b or tablet 100c that a user takes to a coffee shop as compared to a desktop computer 100a that remains at a home or work location, communication may take place over the Internet or other WAN connection while the devices are not co-located. Once the user returns and devices become collocated, the formerly remote devices that communicated via Internet or other WAN connection may switch to a more local connection as appropriate. In other cases, two devices associated with a user might never be collocated, such as a home desktop computer and a work desktop computer, and thus may always rely on Internet or WAN communication.

Figure 3:
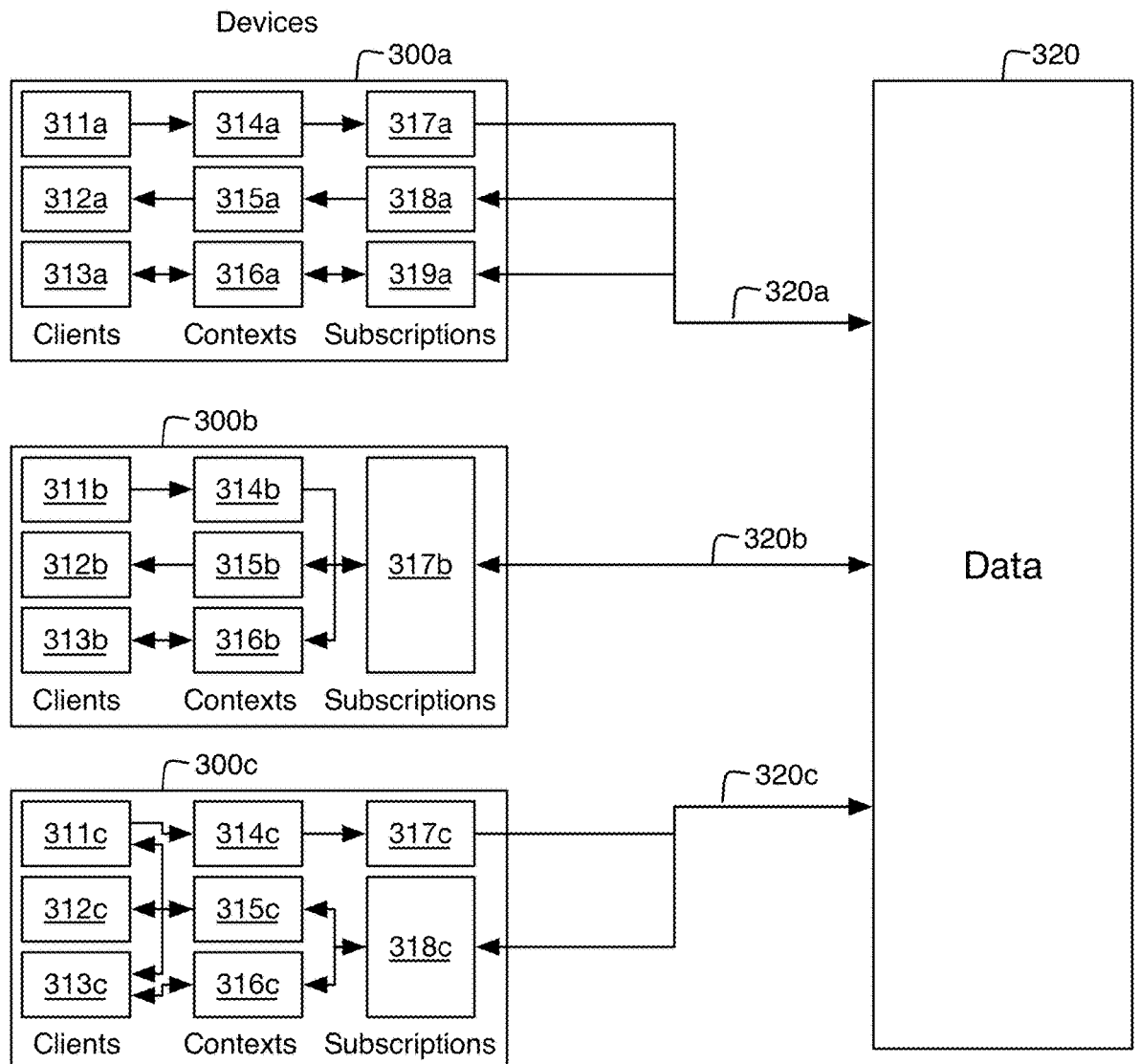
FIG. 3 illustrates a more detailed view of a plurality of devices synchronizing context information.

FIG. 3 illustrates a more detailed view of a plurality of devices synchronizing context information. More specifically, FIG. 3 illustrates three devices 300a, 300b, and 300c that exchange information via a data store 320, although more or fewer devices could be used if applicable. In some embodiments, data store 320 can be a shared, centralized database that is accessible by each device. Such a shared, centralized database may be hosted on a server that is accessible to each device or may be stored on one of the sharing devices that may be thought of as primary. Even in the case of a shared, centralized database, each device using such shared, centralized database for context synchronization as described herein may still cache all or a portion of the shared, centralized database locally, for example to improve performance or reliability, adapt to various connections with different bandwidth, power consumption, or other properties, etc. Nonetheless, the centralized database may be deemed "authoritative" if cached data is different from data in the shared, centralized data store. In other cases, shared data store 320 may be implemented as a distributed database, in which each device maintains a copy of either the entire database or the portions of the database that are relevant to that device. In this case, mechanisms for arbitrating which copy of a particular entry is "authoritative" may be provided. For example, each entry may be designated as having one and only one owner, and thus the owner's copy may be considered authoritative as between any of the distributed copies. As between two non-owners, other mechanisms can be used to determine which copy is authoritative, such as a most recently updated copy, etc. Any of a wide variety of such techniques could be used as applicable, unless otherwise inconsistent with the teachings described herein.

Turning to the devices of FIG. 3, device includes a plurality of clients, a plurality of contexts, and a plurality of subscriptions, each of which are described in greater detail below. Each device has a slightly different configuration of these items for purposes of illustration. These configurations are provided as examples, and multiple combinations, permutations, and variations of these configurations are also possible. To begin a device (e.g., device 300a) may include a plurality of "clients" 311a, 312a, 313a. More or fewer clients could be provided. The client may be either a source or a sink of one or more contexts. A client may include a process or application running on the device that uses the information related by the contexts.

Each client may be related to one or more contexts. For example, device 300a includes three contexts 314a, 315a, and 316a, associated with clients 311a, 312a, and 313a, respectively. Contexts, as described in greater detail below, are data that is produced by or used by a client. A context may be used by multiple clients on the same device and/or by one or more clients on one or more different devices, as illustrated more plainly by the examples discussed below. A context may, but need not necessarily, include a key/value pair representing a state or condition.

A subscription can be the mechanism by which a context is received from or delivered to the shared data store and/or clients on other devices. For example, device 300*a* includes three subscriptions 317*a*, 318*a*, and 319*a*, which are associated with contexts 314*a*, 315*a*, and 316*a*, respectively. A subscription can manage delivery both to and from a client, or optionally in some embodiments, just delivery to a client, with contexts delivered to the shared data store 320 by a client directly or by another means. In either case, a subscription can be based on a push action, where the client that is the source of the context sends or "pushes" the context to one or more clients, or a pull action, where the client that is a consumer of the context retrieves or "pulls" the context from the data store, or optionally another client and/or device.

Returning to the example of device 300*a*, clients 311*a*, 312*a*, and 313*a* may correspond to various applications or processes that are running on device 300*a*. Client 311*a* may be a source of context 314*a*, which is associated with subscription 317*a*. A change in status or condition associated with context 314*a* can cause client 311*a* to provide an updated context to the shared data store 320 via subscription 317*a* (or via other suitable arrangement). Shared data store 320 can be a centralized shared data store or a distributed shared data store, as were each described above, or can be a hybrid of these data store types incorporating any characteristics of either type that are appropriate for a given application. Put another way, data store 320 can reside anywhere along a continuum from a fully centralized data store to a fully distributed data store. Likewise, subscriptions can also be stored centrally or distributed. Storing subscriptions centrally can provide for a server-side capability to filter requests, which may be advantageous in some cases for reducing processing load and/or network bandwidth consumption on a local device. In any case subscription 317*a* can communicate with the shared data source via a communications link 320*a*, which can be any of the exemplary communications links discussed above or any other suitable type of communications link.

Distributed processing can advantageously allow the subscription to express a complex remote query over a set of sensors/data on any given device. This subscription/query can be evaluated on that device as conditions change, and the device can use any available/appropriate communication channel to push an update relating to the query/conditions associated with the subscription directly to interested devices. Thus, in at least some cases, the subscription can be distributed and evaluated directly in the private environment of each respective device, rather than in a central location. Evaluating subscriptions on each respective device can provide a privacy advantage allowing the context values to be sent between devices end to end encrypted, meaning that they cannot be read by any intermediate service provider.

Client 312*a* may be a sink or consumer of context 315*a*, which is associated with subscription 318*a*. Client 312*a* can receive updates of context 315*a* from the shared data store 320 via subscription 318*a*. Subscription 318*a* can communicate with the shared data source via the communications link 320*a*. Client 313*a* may be a source and consumer of context 316*a*, which is associated with subscription 319*a*. Client 313*a* can receive updates of context 316*a* from the shared data store 320 via subscription 319*a*. Subscription 319*a* can communicate with the shared data source via the communications link 320*a*.

Turning to the example of device 300*b*, clients 311*b*, 312*b*, and 313*b* may correspond to various applications or processes that are running on device 300*b*. Client 311*b* may be a source of context 314*b*, which is associated with subscription 317*b*. Client 312*b* may be a sink or consumer of context 315*b*, which is also associated with subscription 317*b*. Client 313*b* may be a source and consumer of context 316*b*, which is also associated with subscription 317*b*. Subscription 317*b* is thus different from the subscriptions 317*a*-319*a* discussed above with respect to device 300*a* in that a single subscription is associated with multiple contexts 314*b*, 315*b*, and 316*b*. A change in status or condition associated with context 314*b* can cause client 311*b* to provide an updated context to the shared data store 320 via subscription 317*b* (or via other suitable arrangement). Client 312*b* can receive updates of context 315*b* from the shared data store 320 via subscription 317*b*. Client 313*b* can provide or receive updates of context 316*b* from the shared data store 320 via subscription 317*b*. Subscription 317*b* can communicate with the shared data source via a communications link 320*b*, which can be any of the exemplary communications links discussed above or any other suitable type of communications link.

Turning to the example of device 300*c*, clients 311*c*, 312*c*, and 313*c* may correspond to various applications or processes that are running on device 300*c*. Client 311*c* may be a source of context 314*c*, which is associated with subscription 317*c*. Client 311*c* may also be a consumer of context 315*c*, which can be associated with a different subscription 318*c*. Client 312*c* may be a sink or consumer of context 315*c*, which is also associated with subscription 318*c*. Client 313*c* may be a consumer of context 315*c* as well a source and consumer of context 316*c*, which can also be associated with subscription 318*c*. Thus, a client can be associated with more than one context, and a single context can be associated with more than one client. Similarly, more than one context may be associated with a subscription, and, in some cases, different applications could have different subscriptions to what are essentially the same contexts. Subscriptions 317*b* and 318*c* can communicate with the shared data source via a communications link 320*c*, which can be any of the exemplary communications links discussed above or any other suitable type of communications link. Each of the above-described device, client, context, subscription configurations are exemplary, and various combinations, permutations, or variations of these arrangements could be provided as appropriate in a given application.

Figure 4:
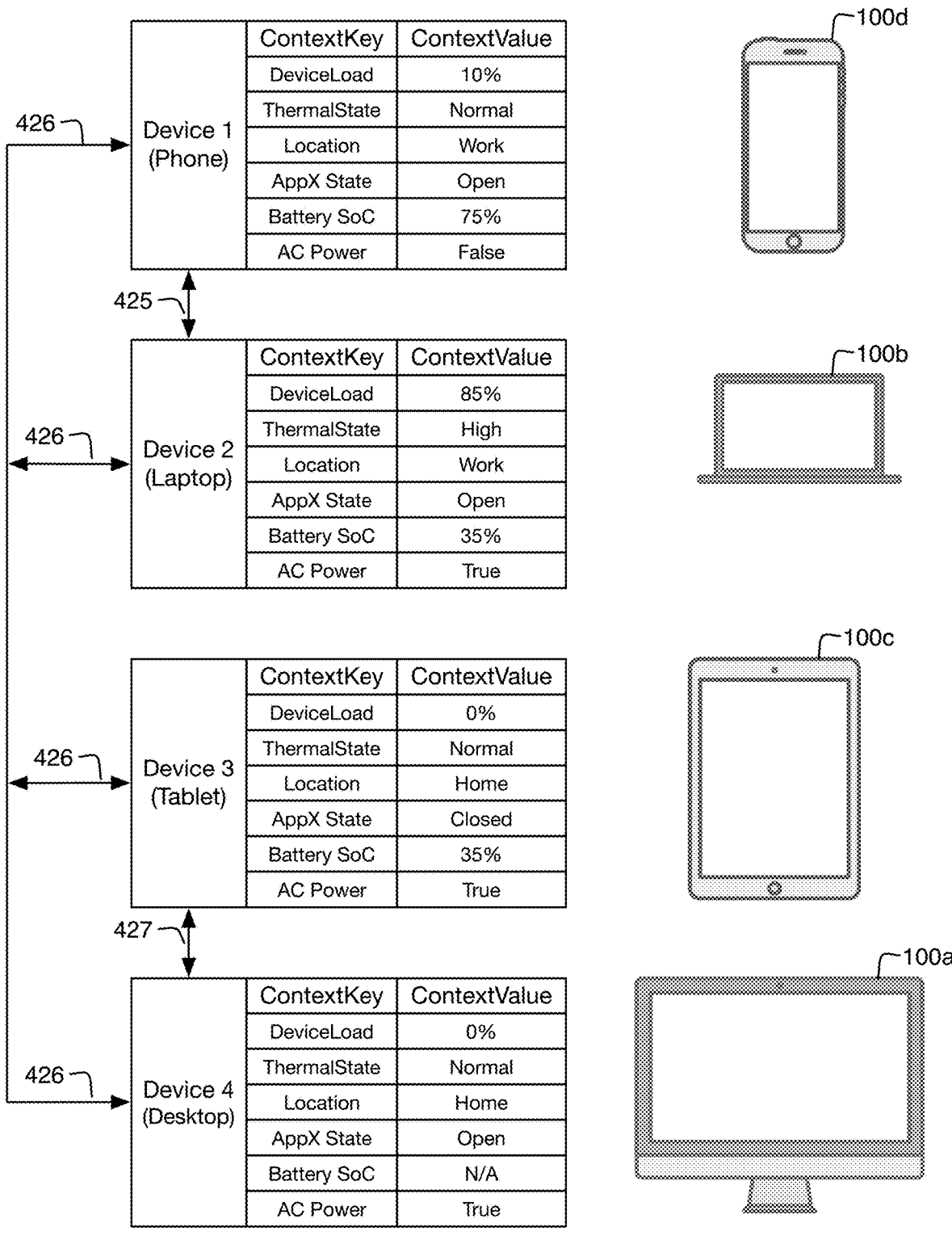
FIG. 4 illustrates a plurality of devices synchronizing context information over various communication links.

FIG. 4 illustrates a plurality of devices synchronizing context information over various communication links. Device 1 can be a smartphone 100*d*. Device 2 can be a notebook/laptop computer 100*b*. Device 3 can be a tablet 100*c*. Device 4 can be a desktop computer 100*a*. As in the examples discussed above, this combination is merely exemplary, and any combination of more, fewer, and/or different devices could be provided.

In the example of FIG. 4, each device has six contexts, which can be shared with the other devices. In some applications, devices could have more or fewer contexts, the contexts could be different amongst the different devices, etc. In the illustrated example, each context includes a key/value pair, identified generally as "ContextKey" and "ContextValue," respectively. However, other data structures and value types could be used as appropriate for a particular application.

The six exemplary contexts include a DeviceLoad context, which can correspond to a workload of the device, such as CPU or GPU utilization or other performance metric. The value for this context can be expressed as a percentage or other suitable data type that conveys the desired information with a sufficient precision for applications that may rely on such context. Alternatively, it could be expressed as being low, medium, high, or any other representation appropriate to the application. In the illustrated example, Device 1 has a DeviceLoad state of 10%, corresponding to relatively low utilization, for example. Device 2 has a DeviceLoad state of 85%, corresponding to a relatively high utilization. Devices 3 and 4 have a DeviceLoad of 0%, corresponding to an idle device.

The ThermalState context can be a binary value indicating whether the device is above or below a corresponding thermal threshold, i.e., whether the thermal state is "high" or "normal." Alternatively, this value could be expressed as a temperature, percentage, or other suitable data type. In the illustrated example, Device 1 has a Normal ThermalState, which correlates with the relatively low DeviceLoad context for this device discussed above. Device 2 has a High ThermalState, which correlates with the high DeviceLoad context for this device discussed above. Devices 3 and 4 have a Normal Thermal State, which correlates with the DeviceLoad contexts for these devices discussed above.

The Location context can store a value corresponding to known locations, such as Work or Home for the user, as illustrated. Alternatively, the Location context could store location in other formats such as latitude/longitude, addresses, etc. Devices 1 and 2 have a Location context of Work, indicating that the user has taken these devices with him to work. Devices 3 and 4 have a location context of Home, indicating that the user has left these devices at home while at work with Devices 1 and 2. This example of a difference in location as between Devices 1 and 2 and Devices 3 and 4 also illustrates a potential difference in the communication path used for context synchronization. More specifically, because Device 1 and Device 2 are collocated (i.e., the user's phone 100d and laptop 100b are at work) they may exchange contexts with each other over a direct local link 425, such as Bluetooth, WiFi, or a LAN connection. Similarly, because Device 3 and Device 4 are collocated (i.e., the user's desktop 100a and tablet 100c have been left at home), they may exchange contexts with each other over a direct local link 427. However, for either Device 1 or Device 2 to communicate with either Device 3 or Device 4, an Internet or WAN link 426 must be used. Notwithstanding the possibility of direct local communication for certain devices, in some cases, even collocated devices may choose to communicate certain contexts or with certain collocated devices over an Internet or WAN connection.

The AppX State context may indicate the status of a particular application on the device, such as whether the corresponding application (i.e., application "X") is open or closed. In other cases, an application state could indicate whether the application is installed or not installed or include information such as a version number or other information relating to the application. In the illustrated example, Device 1, Device 2, and Device 4 have an AppX state of Open, indicating that application "X" is open on those devices, while Device 3 has an AppX state of Closed, indicating that application "X" is closed on that device.

A Battery SoC ("state of charge") state can indicate a percentage value corresponding to the battery state of charge. Alternatively, this context could be provided as a voltage, a high/medium/low indication, or other suitable representation of state. In some cases, an additional state or additional value for the Battery SoC state could be provided to indicate whether the battery is charging, discharging, or at a steady state neither recharging nor discharging. In other cases, a client consuming the Battery SoC context could infer the charging, discharging, or steady state from looking at SoC values over a period of time. In the illustrated example, Device 1 has a Battery SoC of 75% (mostly charged), Device 2 has a Battery SoC of 35% (mostly discharged), Device 3 has a Battery SoC of 35% (mostly discharged), and Device 4 has a Battery SoC state of N/A (not applicable), as desktop computers typically do not have system batteries. In some cases, an inapplicable context may be provided with a null, not applicable, or other similar value. In other cases, a device may not have a context that is inapplicable to that device.

Finally, the contexts could include an AC Power context, indicating whether the device is presently connected to AC power. In the illustrated example, Device 1 has an AC Power state of False, indicating that it is not connected to AC power. Devices 2 and 3 have an AC Power state of True, indicating that they are connected to AC power.

The above-described contexts and ContextKey/ContextValue pairs are provided illustrative examples corresponding to the below discussion of certain exemplary applications of the context synchronization systems and techniques described herein. These examples of both contexts and their applications should not be construed as limiting, as the example applications may rely on additional or alternative contexts not discussed herein, and numerous other contexts and applications can be formulated based on the teachings contained herein.

Figures 5, 6:
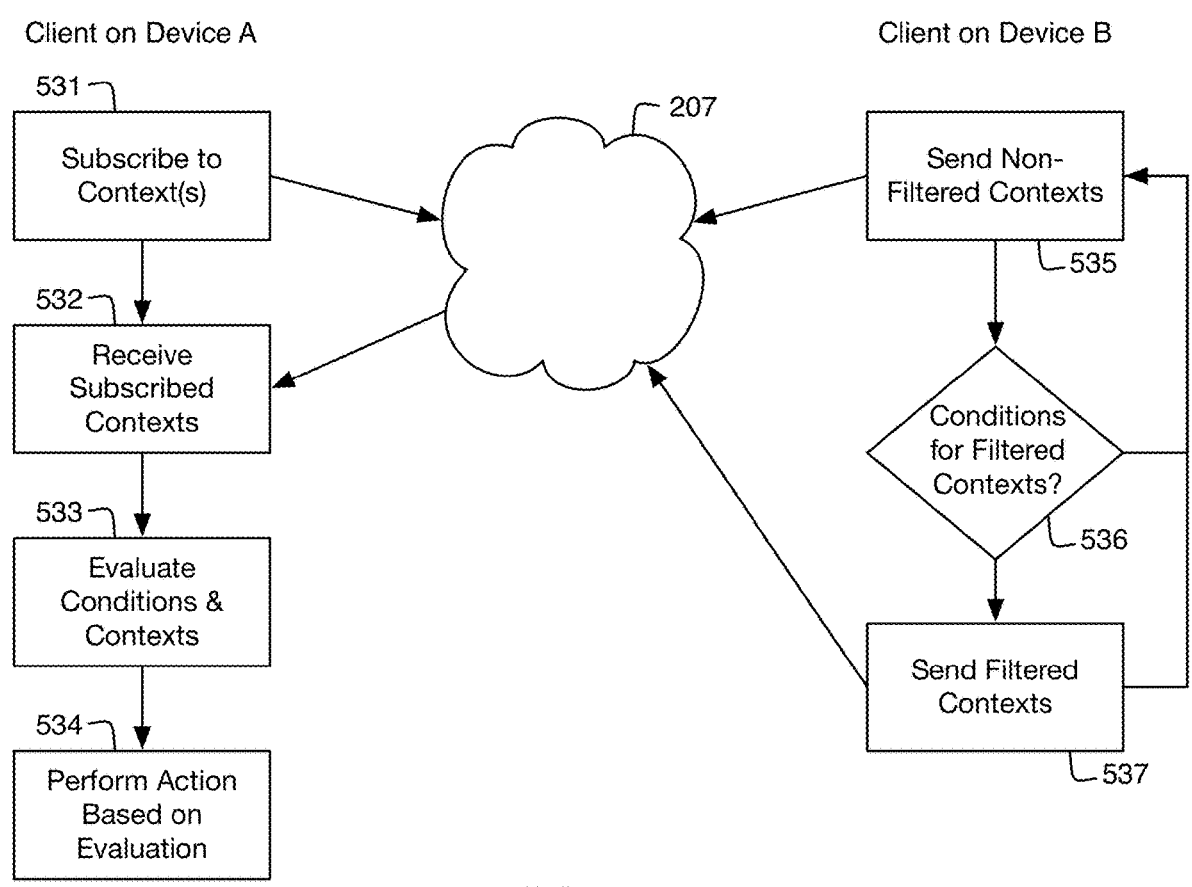
FIG. 5 illustrates devices receiving and sending context information.
FIG. 6 illustrates an optimized battery charging routine for an electronic device.

FIG. 5 illustrates devices receiving and sending context information. On the right-hand side of FIG. 5, Device B can send non-filtered contexts (block 535). These contexts may be sent to a shared data store represented by cloud 207, which, as discussed above can be a centralized shared data store, a distributed shared data store, or a data store that incorporates aspects of both centralized and shared. Non-filtered contexts are those contexts for which updates can be sent to the shared data store regardless of the status of the device. In block 535, Device B can check whether the condition for sending filtered contexts exists. Context sending may be filtered for a variety of reasons, based on particular conditions. For example, some contexts may be sufficiently important or relevant that they should always be processed immediately. Other contexts may be important, but not relevant at a particular time, and thus their sending may be suppressed or postponed until they become more relevant. Other contexts may be less important, and so their sending may be delayed or otherwise prioritized to be sent at a later time. For example, some contexts may not be sufficiently relevant and/or important to "wake" a "sleeping" receiving device so that such receiving device can process them immediately. ("Sleeping," in this context means being placed in a low power state where some or all processing functions may be suspended to reduce power consumption. Similarly, "wake" in this context means to exit the sleeping state, thus increasing power consumption). In some cases, it may be preferable to send an update of such contexts at a later time when the receiving system is awakened for some other reason (e.g., other user interaction). The conditions relating to both relevance and importance may vary for each particular context. For example, if a device is left at home while a user is at another location, many or all of its contexts may be designated less relevant or important as the user is unlikely to be interacting with the device. As another example, contexts relating to background tasks may be de-prioritized relative other tasks, and thus sent less frequently or after more important or relevant tasks. In general, each context may have both an associated relevance and an associated importance that can control the frequency, scheduling, and prioritization of sending updates for each context.

On the left-hand side of FIG. 5, Device A can receive contexts from the shared data store represented by cloud 207. Device A may be both receiving context updates from the shared data store and sending context updates to the shared data store as described with respect to Device B. Likewise, Device B may be both sending context updates to the shared data store as well as receiving context updates from the shared data store as described below with respect to Device A. In block 531, Device A can subscribe to one or more contexts. These contexts may be contexts that are relevant to that device, and the subscribed contexts may include all or only a subset of the contexts available in the shared data store, including all or only a subset of the contexts corresponding to each other device in the shared data store. Additionally, the subscription for each context may be tailored with importance and relevance information. Thus, the subscription could be configured to update more important contexts more frequently while updating less important contexts less frequently. Likewise, the subscription could be configured to delay, deprioritize, or suspend updates of contexts that are not presently relevant to that device. As with the sending of context updates described above, context importance can be used to prioritize updates so that more important information is received and updated more frequently and resources such as battery life, network bandwidth, etc. are spent on more these more important contexts. Context relevance may be used similarly, in that contexts that are presently more relevant may be received or synchronized more frequently, and when the situation changes such that these contexts are less relevant, their retrieval/synchronization frequency may be reduced or even suspended, again providing more effective use of limited resources like energy usage, network bandwidth, processing power, and the like.

In block 532, Device A can receive subscribed contexts from the shared data store. As noted above, this receiving can be dynamically changed and prioritized based on varying conditions. Additionally, a process running on Device A, such as a client of the subscribed context(s) can evaluate both the contexts and conditions (block 533) to determine whether an action should be performed based on the results of the evaluation (block 534). In other words, the synchronized context(s) may be evaluated, optionally in conjunction with additional local condition, to determine whether, when, and how to perform a desired action. Such action can relate to one or more background tasks running on the device and/or to one or more user-facing tasks on the device. Thus, the above-described context synchronization framework may be used to provide a variety of enhanced user experiences that are given as examples below. These examples are illustrative only, and many other applications of the context synchronization framework may also be implemented using these same principles.

Application Data Synchronization

With reference primarily to FIGS. 4 and 5, an improved application data synchronization technique may be provided by use of the context framework synchronization technique described above. As one example, a user may take a number of photos and/or videos with a mobile device, such as smartphone 100d. Additionally, the user may have configured his devices such that photos added to a photo library on one device are synchronized to other devices. In some cases, such photo synchronization may require the transfer of relatively large amounts of data. Thus, a mobile device such as a phone might be configured to delay the upload of the newly taken photos until such time as the phone is connected to a WiFi network rather than a cellular data network, to avoid consuming cellular data that may be more limited. Similarly, transmitting a large amount of data over a cellular, WiFi, or other data network may consume a significant amount of energy. Thus, a mobile device such as a phone might be configured to delay the upload of the newly taken photos until such time as the phone is plugged into an AC power source, or such upload may only be permitted whenever the phone's battery is above a certain state of charge.

However, the above-described delay in uploading newly taken photos from the phone may, in some circumstances, provide a sub-optimal user experience. For example, suppose a user takes a number of photos with a mobile device, such as a phone, but then wants to review or edit those photos on another device, such as a laptop computer 100b that is also with the user. In that case, when the user opens a photo processing application on laptop 100b, and context such as AppPhoto State can change from Closed to Open. This context update can be passed to the phone. When the photo processing app on the phone receives notice via the updated context that the user is attempting to view photos on the laptop computer, the phone photo app can re-prioritize a discretionary workload to be of higher priority and initiate the upload of the newly taken photos, even if such upload might otherwise be delayed or inhibited because of a sub-optimal network connection, battery state of charge, or other condition(s) existing on the phone.

The above-described context synchronization framework can allow even more finely tuned variations of the application data synchronization technique described above. Suppose that in the same scenario described above (newly taken photos on the user's phone 100d), the user had also left his desktop computer turned on and running the photos app. Based on just the logic described above, the AppPhoto State context of Open from the desktop computer alone might trigger an upload of the photos from the user's phone 100d. However, in this case there are other contexts that indicate that this is not necessarily a desirable action for the user. For example, the Location context of desktop computer 100a has a value of Home, while the Location context of phone 100d has a value of Work. Similarly, the DeviceLoad context of desktop 100a has a value of 0%, indicating that the device is idle. Thus, it is can be inferred that even though the photo processing app on the desktop computer may be turned on, the user is not presently there and thus there is no pressing need for the newly taken photos to be uploaded (absent the indications of photo related activity from laptop 100b, which is both at the location of the user presumed from the phone location as well as having a device load that indicates interactive use). In some embodiments, the AppX State context updates from desktop computer 100a can be deprioritized or inhibited based on their lower importance or relevance, given that the user is not presently using the application and/or device.

The application data synchronization technique described above need not be limited to newly taken photos or to photo related applications. Similar logic could be applied to other user-facing applications, including productivity applications such as word processors, spreadsheets, presentation software, and the like, allowing for synchronization of the underlying data files to be synchronized immediately when a corresponding application is opened on another device, even if the synchronization might otherwise be delayed, deprioritized, or inhibited because of other conditions. Similarly, the logic could be applied to media consumption software, providing synchronization of media being consumed and or a place in the media such as a timestamp in a video or audio file, a bookmark in an e-book, website, or article, a progress state in a game, etc. In a most general sense, the data synchronization can be triggered by a context update that indicates that a corresponding application has been opened on another device. However, the client that subscribes to this context may employ additional logic, including the evaluation of other synchronized contexts as well as local condition to determine whether to perform an action based on the contexts and conditions. Additionally, the contexts may themselves have relevance and/or importance based prioritization, delays, inhibitions of synchronization, etc. Moreover, although existing application data synchronization schemes exist, these rely on synchronization logic integral with the particular application. In other words, each client relies on its own internal logic and data stores to perform the synchronization task. Conversely the context synchronization techniques described above can provide for a more generally available synchronization framework that can allow multiple client applications to share context data yet process that context data differently in terms of their own internal logic and priorities to provide a suitable experience for the user.

Distributed Data Processing

Another application of the context synchronization framework described above is distributed data processing. One example of such distributed processing can again be based on the scenario in which a user takes a number of new photographs using a mobile device such as phone 100d. The distributed processing need not be limited to newly taken photos, or even to photos more generally, but this is merely used as a convenient example. In this example, a user may have a photo management application that is configured to analyze newly added photos to identify subjects, such as people, places, etc. and automatically group the photos accordingly. The analysis of the newly added photos can be based on metadata contained within the photos, such as GPS data, camera data, etc., or can be based on an analysis of the photographic information itself, such as machine learning processing of the image data to identify the subjects of the photograph. Such processing can, in some cases, be relatively intensive in terms of processing requirements and/or can be accelerated by the use of specialized hardware, such as graphic processing units (GPUs) or image processing units (IPUs) that may be present on another device. In some cases, even if suitable hardware is available on the local device, energy usage or completion time constraints may suggest that it would be possible or desirable to distribute a portion of the task to one or more other devices.

Turning again to FIGS. 4 and 5, suppose that the user has taken the photos in need of analysis via distributed data processing using phone 100d. However, assume that each of laptop 100b, tablet 100c, and desktop computer 100a also include suitable hardware and software to also perform the desired analysis. By evaluating certain contexts from each device phone 100d can request that the other devices assist in the analysis as appropriate. Alternatively, each of the other devices can evaluate certain contexts to determine whether they should engage in the queued processing without a specific request from device 100d. Numerous contexts could be used alone or, more likely, in various combinations, to facilitate the distributed processing task. For example, Desktop 100a has a low DeviceLoad, a Normal Thermal State, and is connected to AC power. Each of these contexts suggests that desktop 100a could contribute significant computing resources to the distributed processing task (photo analysis). Similarly, tablet 100c also exhibits similar properties, and thus might also contribute. However, if tablet 100c had an AC Power context of False, indicating that it was not connected to AC power, it might not be desirable for it to contribute to the distributed processing task, as it would further deplete the battery beyond its already low state of charge of 35%. Likewise, laptop 100b exhibits a high DeviceLoad and ThermalState, each suggesting that it might not be appropriate for it to contribute to the distributed data processing task. However, if either of these parameters transition or are updated to a context value indicating that it would be appropriate for Device 2 to contribute to the distributed data processing task, then such devices could contribute to that task when such conditions arise.

The distributed data processing tasks may, but need not be, background tasks. In some cases it may be desirable for another device to contribute to a distributed task that is a foreground or user-facing/user-interactive task. For example, a game or video editing task on a device with relatively limited graphics processing capabilities might offload graphics intensive processing to another device that has a more capable GPU. This may be particularly advantageous in the case of devices that are collocated or otherwise have a relatively high network bandwidth between them. Additional contexts relating to device capabilities, network connection, network speed, etc. can be used to inform and control such a distributed processing task.

Remote Optimized Battery Charging

The above-described context synchronization examples relate to application-based processing. However, context synchronization can also be used to facilitate device management related tasks as well. For example, context synchronization can be used to facilitate remote optimized battery charging. FIG. 6 illustrates a generalized optimized battery charging routine for an electronic device. More specifically, FIG. 6 illustrates a plot 600 of battery state of charge on the vertical axis versus time on the horizontal axis. Various events in the charging sequence are identified as times on the time axis. For example, prior to the device being plugged in to an external power source (such as mains power, an external battery pack, a car accessory adapter, etc.), the battery may be discharging as indicated by curve segment 641. After the device is plugged in to the external power source, the battery can begin charging as indicated by curve segment 642. Upon being plugged in to the external power source, the device can determine an estimated disconnect time 640 at which it expects to be disconnected from the external power source, which can be used to intelligently adapt the charging sequence as described in greater detail below. Additionally, the estimated disconnect time determination can be based at least in part on synchronized contexts, as also described in greater detail below.

The determination of estimated disconnect time 640 can be made in various ways based on sensor inputs (e.g., time of day, location, etc.) and a machine learning model or other program structure that accounts for prior activity or otherwise infers a likely disconnect time. This can include the use of synchronized contexts, as described above. For example, if a user typically plugs in a device at home at around 10 pm and unplugs it around 6 am, the device can infer that— if it is plugged in at around 10 pm at the user's home location—it will remain on the charger until about 6 am and can thus adapt the charging sequence accordingly. The same would be true if a user plugs in at the user's work location around 8 am and unplugs around 12 pm, which could allow the system to infer that the user is typically at his desk at this time. Alternatively, if a device is plugged in at home while the user is at work, as can be determined by comparison of location-related contexts synchronized as described above, the system could infer that the device will remain plugged in at least until the user refers home. The inferences can be based on inputs other than time and location. For example, if a user plugs in and the device can detect that it is moving at a relatively high rate of speed, the device might infer that it is in an automobile. Depending on the particular implementation of the machine learning model or other program structure, more or less detailed inferences may be derived. In any case, the inference may be used to modify the charging sequence as follows.

In the first example of the preceding paragraph, in which the device infers that it is at the user's home location and has been plugged in at around 10 pm, the device can assume that it will remain connected to mains power until about 6 am. Thus, the device does not need to charge at the maximum rate (represented by the slope of curve segment 642) to reach full charge as soon as possible. In fact, it may be desirable to slow the rate of charging and/or pause charging for a time period, depicted by curve segment 643 to delay reaching full charge of the battery. For example, a battery's useful life (i.e., battery health or number of charge cycles over which substantially full capacity can be maintained) may be extended by reducing the amount of time that the battery spends at full charge. Thus, in the optimized battery charging example of FIG. 6, battery charging may be paused during interval 643. Additionally or alternatively, if the user plugs in a device but then leaves for another location, as determined at least in part by synchronized contexts, then charging can also be slowed, paused, or the estimated disconnection time can be recomputed as appropriate based on the location context and other queues.

Estimated disconnect time 640 may be further used by the device to resume charging at a time selected to ensure that the battery reaches a fully charged state (represented by charge level/curve segment 645) prior to estimated disconnect time 640. This resumed charging is represented by curve segment 644. This charging segment may take place at a reduced rate, for example because the battery is closer to full charge, as indicated by the reduced slope of resumed charging segment 644 versus original charging segment 642. In any case, the machine learning model or other program structure that controls the optimized battery charging sequence may account for the expected charging rate and estimated disconnect time to ensure that the battery is fully charged prior to the user disconnecting the device from the external power source. This may be accomplished by selecting an estimated disconnection time that is before the likely or typical disconnect time and/or by ensuring that the battery is fully charged before estimated disconnect time 640. Additionally, the estimated disconnection time can be updated by synchronized contexts that imply user behavior, e.g., a user with a location suggesting heading towards home or arriving at home when a normal usage pattern would not have the user at home during that time period. Once the user disconnects the device from the external power source, the battery may begin discharging, as illustrated by curve segment 646.

The optimized battery charging technique described with respect to FIG. 6 is "optimized" in the sense that it may improve battery health by reducing the amount of time that the battery spends at a full charge state. As suggested above, the optimized battery charging routine for an electronic device may be further optimized to adapt battery charging to context information as described above. The examples above relate to a user's location or other location-related contexts, thus allowing for "remote" optimized battery charging, when a plugged in device is at a different location from the user. The battery charging optimizations that can be applied based on such contexts can include adapting the estimated disconnection time, slowing a rate of charging, pausing or resuming charging, etc. Although location based contexts may be most useful in allowing for battery charging optimization, other synchronized contexts may also be useful. For example, battery charging profiles may be recalibrated to allow for the battery to fully charge even in the case of significant power consumption by the device for a distributed processing task.

Otherwise, the adaptive charging technique depicted may proceed as described above. Thus, in the optimized battery charging example of FIG. 6, battery charging may be paused during the interval corresponding to curve segment 643, which can be determined at least in part based on received context information for other devices. Battery charging may be resumed during the interval corresponding to curve segment 644 to ensure that the battery is completely charged, represented by curve segment 645 ahead of both the estimated disconnect time 640 and the actual disconnection time, upon which the battery can begin discharging, as indicated by curve segment 646.

In some operational condition, it may be desirable to inhibit or otherwise forego optimization of battery charging optimization. For example, if the battery state of charge is below some discharged level threshold (e.g., below 30%, 25%, etc.), it may be desirable to begin charging immediately to ensure that power is available to the device regardless of context information. Similarly, once the battery reaches a state of charge corresponding to some charged level threshold (e.g., 75%, 80%, etc.), it may be desirable to allow the battery to be fully charged just prior to the estimated disconnection time regardless of the current status of the context information. Alternatively, it may be desirable to accelerate the predicted usage/disconnect time based on a change in the context information occurring during the paused interval.

Figure 7:
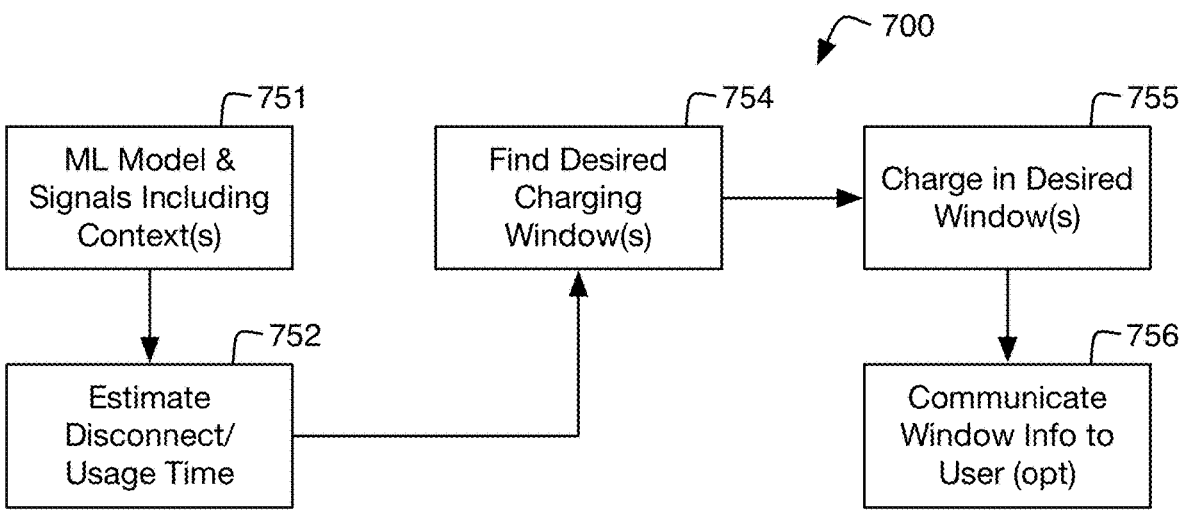
FIG. 7 illustrates a flowchart of an optimized battery charging routine for an electronic device that adapts battery charging.

FIG. 7 illustrates a flowchart of an optimized battery charging routine 700 for an electronic device that adapts battery charging. This flowchart depicts functionality that may be implemented by electronic device 100, including, for example, by processor 101, which may include one or more processors as described above. In some cases, different functions depicted in the flowchart of FIG. 7 may be implemented by different processors of a multi-processor system 100 or by a separate processor, microcontroller, or other charger control circuitry. As but one example, a processor 101 that includes a CPU, a GPU, and a NPU (neural processing unit) may use the NPU to perform certain machine learning computations. In any case, a synchronized context based adaptive optimized battery charging routine 700 can include a machine learning model and signal processing block 751 that can be used to detect when the electronic device is connected to an external power source and initiate the optimized charging routine as described above. These signals may include the indication of connection to an external power source as well as other signals, including synchronized remote contexts, that allow the processor to make predictions about the likely duration of connection to the power source. For example, a location signal may indicate that the device is at a particular location, while a synchronized context from another device may indicate that the user is at another location. Alternatively, a changing location signal or a speed/velocity sensor may indicate that the device is plugged in to vehicle accessory power source. Similarly, a changing location context or accumulated location contexts for another device associated more directly with a user's location may indicate that the user is returning, indicating that the predicted disconnect time may need to be updated. Other synchronized context signals from other devices, such as other devices associated with the user, may also be used as appropriate. These and other signals may be processed by a machine learning model to attempt to identify the power source and to predict a disconnect time, as indicated by block 752.

As alluded to above, the estimated disconnect time can be derived from the external signals including context signals synchronized from another device. For example, a time signal corresponding to late evening and a location signal corresponding to a user's home along with a pattern of prior usage can be used to infer that an overnight charging cycle is beginning. Or, a time signal corresponding to mid-day with a context signal indicating that one or more other devices associated with the user are at another location (e.g., work) while the device implementing optimized charging is at another location (e.g., home) can indicate that the device will not be used at least until the user's return, which can be predicted based on prior usage patterns and/or a change in the synchronized contexts. Alternatively, being plugged in at an unusual time or location along with a low battery state of charge may be used to infer that the user needs the device to charge as rapidly as practicable. In any case, the predicted disconnect or usage time can be used to find desired and/or undesired charging windows (block 754), which can correspond to preferred times for the battery to be in certain states. Once the desired charging windows are identified (block 754) the processor can operate the charging system of the device to charge the battery during the desired windows, as depicted in block 755. In some cases, the processor can also communicate information about the charging process and the desired charging windows to the user (block 756). Examples of such communication and optional user interaction are discussed in greater detail below with respect to FIG. 8.

Electronic device 100 can be configured to implement an optimized battery charging routine that uses synchronized contexts as described above to inform the optimized battery charging routine. More specifically, electronic device 100 can include a charge controller as part of power system 108. The charge controller can include electronic circuitry (including analog, digital, and/or programmable circuitry) that is configured to control whether, when, and at what rate a battery of electronic device 100 is charged. It should be noted that in addition to or rather than permitting or inhibiting charging as described above, the optimized battery charging routine could also be used to control the rate at which the battery charges responsive to at least the synchronized context signals. Thus, rather than inhibiting battery charging entirely during the pause time interval 643, the system could be configured to slow battery charging during such intervals and increase the battery charging rate as the estimated disconnect/usage time 640 approaches.

Figure 8:
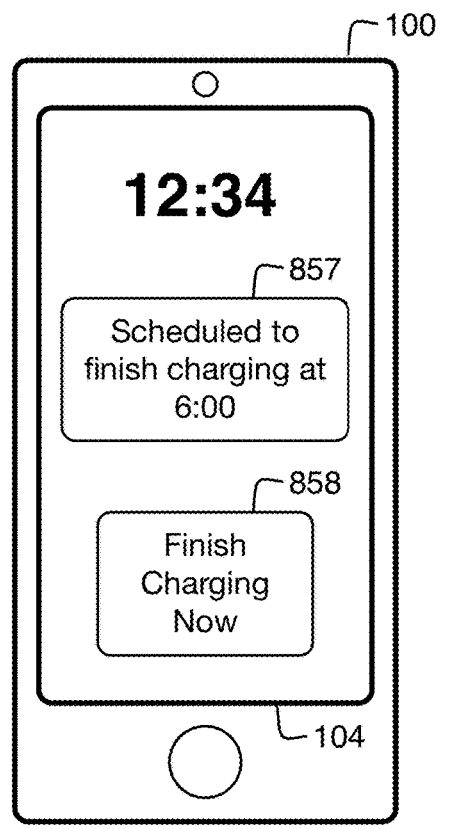
FIG. 8 illustrates an electronic device that communicates parameters of an optimized battery charging routine to a user.

FIG. 8 illustrates an electronic device 100 that communicates parameters of an optimized battery charging routine to a user. FIG. 8 illustrates electronic device 100 as a smartphone, but could in fact be any of a variety of electronic devices, such as a tablet computer, notebook or laptop computer, etc. As one example, electronic device 100 could use a display 104 to present a message 857 to the user indicating a time at which charging is scheduled to be finished. In some cases, electronic device 100 could present a control element 858, such as a UI button, that the user could use to bypass or override the optimized charging routine and complete charging as expeditiously as possible. In some embodiments, control element 858 and message 857 could be part of the same UI element, such as a GUI message/button, etc. In other cases, one or more other output devices of electronic device 100 could be used to provide the indication to the user and one or more other input devices of electronic device 100 could be used to receive input from the user indicating that the user wishes to bypass the optimized charging setup and complete charging as expeditiously as possible. This might be used, for example, to allow another user who might share the remote device to expedite charging so that this second user can use the device, even though the primary user may not be at the same location. There could also be cross device optimized charging control. For example, there could be a user interface on a device that is with the user (e.g., a smartphone) to control whether to immediately charge a remotely located device that would otherwise be performing delayed charging as part of a remote optimized battery charging scheme.

Message 857 could also present additional information to the user. As one example, message 857 might specifically indicate that battery charging is paused due to a status derived from one or more synchronized context signals and/or that battery charging is paused to optimize battery health.

Enhanced Power Saving

Figure 9:
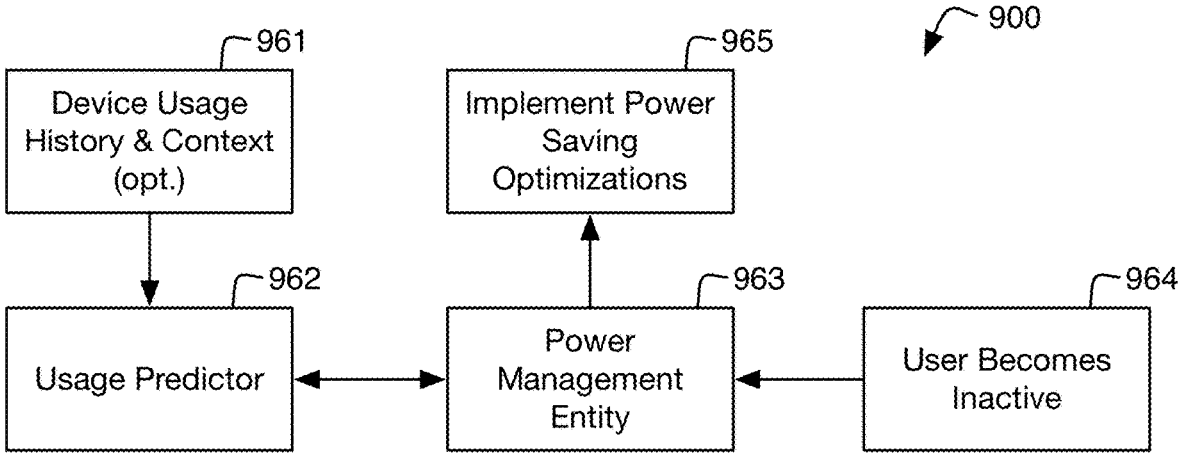
FIG. 9 illustrates a flow chart/block diagram of an enhanced power saving mode for an electronic device.

In some cases, synchronized context information as described above may be used to facilitate an enhanced power saving mode for a device. However, an enhanced power saving mode may also or alternatively be implemented without using synchronized context information as described above. FIG. 9 illustrates a flow chart/block diagram 900 enabling a device as described above to implement an enhanced power saving mode. The various activities described in flow chart/block diagram 1000 may be performed by the device, specifically by one or more processors of the device using data stored in one or more memory or storage locations of the device and/or retrieved via one or more communications or I/O interfaces of the device.

Beginning with block 961, the device may store or otherwise obtain or retrieve device usage history information, which can optionally include synchronized context information as described above. This may be, for example, by one or more processes running on a processor of the device retrieving usage data from a local storage/data store and/or from a remote storage/data store. This usage history data (and optionally synchronized context data) may be provided to a usage predictor 962. Usage 962 may also be a process or process running on a processor of the device. As described in greater detail below with respect to FIGS. 10 and 11, the usage predictor can use the usage history data (and optionally synchronized context data) to determine whether an extended period of inactivity is predicted. If so, usage predictor 962 can communicate this information to a power management entity 963, which can be, for example, another process running on a processor of the device. In some cases, this may be a process running on a power management microcontroller or other suitable control circuitry.

Power management entity 963 may also monitor various sensors, inputs, and/or optionally remote context information associated with the device to determine when a user of the device becomes inactive (block 964). For example, power management entity may detect that a user has become inactive by detecting a lack of input from the user. In the case of handheld devices, detecting a lack of motion, such as might be associated with the device being set down, can also be used to infer user inactivity. Alternatively, ambient light sensors, microphones, wireless signals from peripheral devices, etc., can all be used to infer user inactivity. Additionally, synchronized contexts as described above may optionally form part of this process. For example, a device that has a location of home (e.g., tablet 100*c* in FIG. 4), while other devices associated with the user have another location, such as work (e.g., phone 100*d* and laptop 100*b* in FIG. 4), can infer that it may undergo an extended period of inactivity. The exact period of inactivity can be derived based on prior usage data and/or updates to the synchronized context signals. These and other cues from which inactivity can be inferred are all represented by block 964 in FIG. 9.

In at least some cases, power management entity 963 may be in bidirectional communication with usage predictor 962. Thus, when power management entity 963 detects user inactivity, it may query usage predictor 962 to know when user activity is expected to resume, or, alternatively, how long the period of user activity may be expected to last. This may involve exchange of information received by power management entity 963 from user inactivity detector 964 with usage predictor 962. In other configuration, the data, signals, and information triggering the user inactivity detection may be otherwise provided to or available to usage predictor 962. Usage predictor 962 may implement any of a wide variety of programming and logic structures to infer the duration of the user's inactivity, including various combinations of traditional programming, machine learning algorithms, neural networks, "fuzzy logic" processing, and the like.

Once usage predictor 962 has determined that a period of "extended" user inactivity is predicted, the usage predictor can notify power management entity 963 that power saving optimizations 965 may be implemented for a period of time up to, but not longer than, the expected duration of the user inactivity period. These power saving optimizations can include a wide variety of activities normally performed by the device that are slowed, postponed, or otherwise delayed or interrupted during all or at least a portion of the predicted period of extended inactivity. For example, on-board radios associated with cellular, WiFi, Bluetooth, ultrawideband (UWB), etc. can be turned off or placed in a low power mode. Background tasks, such as fetching of emails or text messages, synchronizing application data, processing of newly received data, etc. can be slowed (to reduce power consumption by the relevant task) or postponed (to eliminate power consumption by that particular task until such time as it resumes). Additionally, user notifications may be altered. For example, display notifications, which would require activating the display, may be suppressed—although it might still be desirable to provide audio or haptic notifications. Although, depending on the power consumption of the various notification modes (e.g., visual, audio, haptic, etc.) and the expected or configured notification preferences, one or all of the notification modes may be suppressed as appropriate. The enhanced power savings mode can be configured to modify the performance of any or all subsystems, foreground tasks, background tasks, user notifications, etc. of an electronic device as desired by either the user and/or the implementers of the system. For example, if the system is configured to periodically wake from a non-enhanced low power state to perform a background task, etc., these intervals may be extended or certain wakes may be inhibited while in the enhanced low power mode.

Some existing electronic devices may employ a low power mode, in which certain background tasks, notifications, radio or other systems status are altered to provide reduced power consumption. However, the above-described enhanced power savings mode can be distinguished from such systems at least in that such pre-existing power saving modes are typically selected or manually configured by the user whereas the present enhanced power savings modes are triggered based on inference of extended user inactivity by the device itself.

Figure 10:
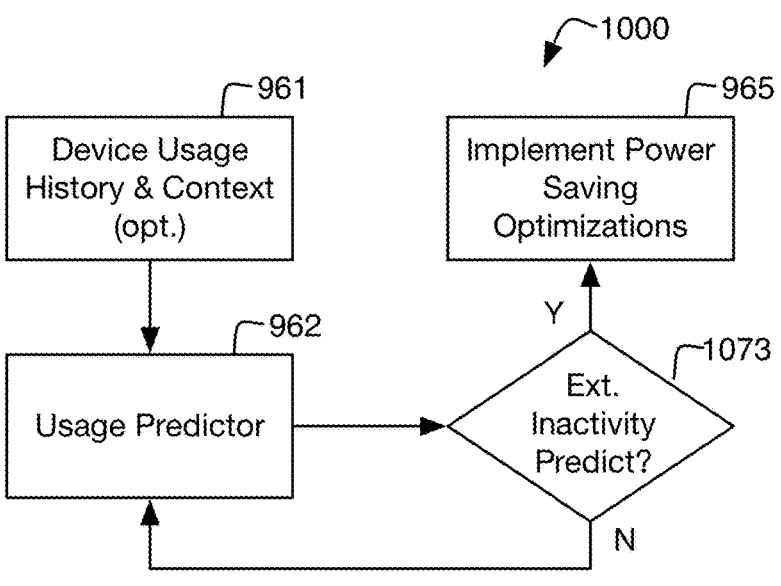
FIG. 10 illustrates a flow chart/block diagram for entering an enhanced power saving mode.

FIG. 10 illustrates a flow chart/block diagram 1000 for entering an enhanced power saving mode. The various activities described in flow chart/block diagram 1000 may be performed by the device, specifically by one or more processors of the device using data stored in one or more memory or storage locations of the device and/or retrieved via one or more communications or I/O interfaces of the device. Block 961 corresponds to retrieving or otherwise obtaining device usage history information, and optionally synchronized context information, as described above. Block 962 corresponds to the usage predictor as described above. The usage predictor can analyze the usage history and optional synchronized context info (as well as any other signals indicating user inactivity) to make a prediction of an extended period of inactivity. As noted above, the usage predictor 962 can implement any suitable combination of algorithms, including machine learning algorithms, to perform this prediction. These predictions can be made continuously, periodically, or in request to a particular request, e.g., from power management entity 963. If extended inactivity is predicted (block 1073), then the power saving optimizations corresponding to the enhanced power saving mode may be implemented (block 965). These power saving optimizations can include any of the particular optimizations discussed above or any other suitable power consumption reduction technique. Otherwise, usage predictor 962 may continue to make continuous, periodic, or requested usage predictions.

Figure 11:
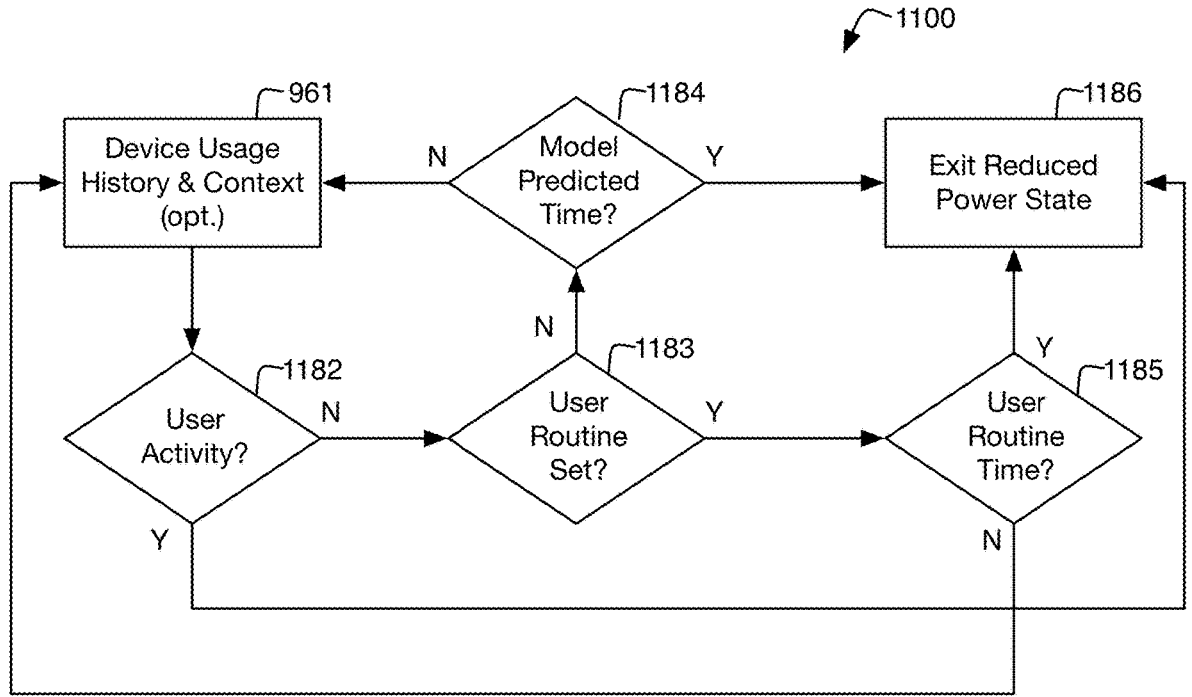
FIG. 11 illustrates a flow chart/block diagram for exiting an enhanced power saving mode.

FIG. 11 illustrates a flow chart/block diagram 1100 for exiting an enhanced power saving mode. The various activities described in flow chart/block diagram 1000 may be performed by the device, specifically by one or more processors of the device using data stored in one or more memory or storage locations of the device and/or retrieved via one or more communications or I/O interfaces of the device. Beginning with block 961, the usage history (including present usage signals such as user interaction with an I/O device, motion or ambient light sensors, etc.) and optional synchronized context signals can be analyzed for user activity associated with the device (block 1182). If user activity associated with the present device is detected, then the device can exit the enhanced reduced power state (block 1186), for example, by providing appropriate signaling to power management entity 963 (FIG. 9).

Otherwise, if no user activity is detected, predictor 962 (or other processing element of the device) can determine whether a user routine has been set. For example, a user may set a device to enter an enhanced power savings mode during certain intervals. One example of such an interval for a device such as a mobile phone might be overnight while the user is sleeping. Alternatively or additionally, for a device typically left at home or otherwise unused during the work day such as a personal tablet, the workday period on weekdays may be set as a period of expected inactivity. Conversely, for a work device, such as a laptop computer, nights and/or weekends may be set by the user as times when the user's routine would leave such devices inactive. The foregoing examples are not exhaustive, and a user could set any time period or periods as times during which the user's routine would normally have the device is inactive.

In any case, if a user routine is set (block 1183), then it can be determined whether the end of the inactive period associated with the user time has been reached (block 1185). If so, then the enhanced reduced power state can be exited (block 1186), otherwise, usage history, usage signals, and optional context information may continue to be monitored (blocks 961, 1182). Returning to block 1183, if no user routine has been set then it can be determined whether the time predicted for the end of extended inactivity has been reached (block 1184). If so, then the enhanced reduced power state can be exited (block 1186), otherwise, usage history, usage signals, and optional context information may continue to be monitored (blocks 961, 1182). To summarize, an exit from the enhanced reduced power state can be triggered by any of: (1) user activity (e.g., detected user interaction with the device), (2) the end of a routine period of extended inactivity set by the user, or (3) the end of a predicted time period of extended activity as predicted by the device. Additionally, the user routine may, but need not be a periodic or recurring time period. In some cases the user could manually set the device to enter a period of extended inactivity, with a specified time for exiting such period of extended inactivity.

As used at various points in this disclosure, machine learning may refer to algorithms, statistical models, and the like that computer systems (such as electronic device 100) can use to perform a specific task with or without using explicit instructions. For example, a machine learning process may generate a mathematical model based on a sample of data, known as "training data," to make predictions or decisions without being explicitly programmed to perform the task. Depending on the inferences to be made, electronic device 100 (or a sub-system or associated device thereof) may implement different forms of machine learning. For example, in some embodiments (e.g., when particular known examples exist that correlate to future predictions or estimates that the machine learning engine may be tasked with generating), a machine learning engine may implement supervised machine learning. In supervised machine learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine learning engine to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine learning engine may implement other machine learning techniques, such as those based on estimated density and graph connectivity.

The foregoing describes exemplary embodiments of shifting certain tasks performed by an electronic device based on grid conditions associated with an external power source connected to the electronic device. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of electronic systems that are able to transmit certain information amongst other systems and devices. The present disclosure contemplates this passage of information improves the devices' functionality. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted and allow users to "opt in" or "opt out" of participation.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communications between devices are intercepted, spoofed, or otherwise subject to tampering.

The invention claimed is:

1. An electronic device comprising:
a power system including a battery; and
a processor programmed to:
   detect connection of an external power source to the electronic device;
   determine an estimated disconnection time at which the external power source is expected to be disconnected from the electronic device based at least in part on one or more contexts synchronized from one or more other devices associated with a user of the electronic device;
   identify one or more desired battery charging intervals prior to the estimated disconnection time; and
   operate the power system to charge the battery from the external power source during the identified one or more desired battery charging intervals.

2. The electronic device of claim 1 wherein the processor is programmed to determine an estimated disconnection time using a machine learning model.

3. The electronic device of claim 1 wherein the one or more contexts synchronized from one or more other devices associated with the user of the electronic device provides indication of the user's location.

4. The electronic device of claim 3 wherein if the one or more contexts synchronized from one or more other devices associated with the user of the electronic device indicates that the user is at a different location than the electronic device, the estimated disconnection time is determined based at least in part on an expected time for the user to return to the location of the electronic device.

5. The electronic device of claim 4 wherein the one or more desired battery charging intervals are selected to reduce time that the battery spends at full charge.

6. The electronic device of claim 1 wherein the processor is further programmed to operate the power system to charge the battery from the external power source during the identified one or more desired battery charging intervals by regulating a rate of battery charging to reduce time that the battery spends at full charge.

7. The electronic device of claim 1 further comprising a display, wherein the processor is further programmed to communicate information about the one or more desired battery charging intervals to a user via the display.

8. The electronic device of claim 1 further comprising an input device, wherein the processor is further programmed to receive user input regarding charging via the input device.

9. A method of operating an electronic device, the method performed by a processor of the electronic device and comprising:
   detecting connection of an external power source to the electronic device;
   determining an estimated disconnection time at which the external power source is expected to be disconnected from the electronic device based at least in part on one or more contexts synchronized from one or more other devices associated with a user of the electronic device;

identifying one or more desired battery charging intervals prior to the estimated disconnection time; and
operating the electronic device to charge a battery of the electronic device from the external power source during the identified one or more desired battery charging intervals.

10. The method of claim 9 wherein determining an estimated disconnection time further comprises using a machine learning model.

11. The method of claim 9 wherein the one or more contexts synchronized from one or more other devices associated with the user of the electronic device provides indication of the user's location.

12. The method of claim 11 wherein if the one or more contexts synchronized from one or more other devices associated with the user of the electronic device indicates that the user is at a different location than the electronic device, the estimated disconnection time is determined based at least in part on an expected time for the user to return to the location of the electronic device.

13. The method of claim 12 wherein the one or more desired battery charging intervals are selected to reduce time that the battery spends at full charge.

14. The method of claim 9 further comprising regulating a rate of battery charging to reduce time that the battery spends at full charge.

15. The method of claim 9 further comprising communicating information about the one or more desired battery charging intervals to a user via a display of the electronic device.

16. The method of claim 15 further comprising receiving user input regarding charging via an input of the electronic device.

17. An electronic device comprising:
a power system including a battery; and
a processor programmed to:
   receive one or more contexts synchronized from one or more other devices associated with a user of the electronic device;
   determine, at least in part based on the one or more contexts synchronized from one or more other devices associated with the user of the electronic device, one or more battery charging intervals; and
   operate the power system to charge the battery from an external power source during the determined one or more battery charging intervals.

18. The electronic device of claim 17 wherein the processor is programmed to determine the one or more battery charging intervals using a machine learning model.

19. The electronic device of claim 17 wherein the one or more contexts synchronized from one or more other devices associated with the user of the electronic device provides indication of the user's location, and if the one or more contexts synchronized from one or more other devices associated with the user of the electronic device indicates that the user is at a different location than the electronic device, the one or more battery charging intervals determined based at least in part on an expected time for the user to return to the location of the electronic device.

20. The electronic device of claim 19 wherein the one or more battery charging intervals are selected to reduce time that the battery spends at full charge.

21. The electronic device of claim 17 wherein the processor is further programmed to operate the power system to charge the battery during the one or more battery charging intervals by regulating a rate of battery charging to reduce time that the battery spends at full charge.

\* \* \* \* \*